US008930039B2

(12) United States Patent
Murray et al.

(10) Patent No.: US 8,930,039 B2
(45) Date of Patent: Jan. 6, 2015

(54) COMBINE PERFORMANCE EVALUATION TOOL

(75) Inventors: Craig E. Murray, Davenport, IA (US);
Dale W. Panoushek, Orion, IL (US);
Tyler L Nelson, Rochester, MN (US)

(73) Assignee: CNH Industrial America LLC, New Holland, PA (US)

( * ) Notice: Subject to any disclaimer, the term of this patent is extended or adjusted under 35 U.S.C. 154(b) by 148 days.

(21) Appl. No.: 13/493,440

(22) Filed: Jun. 11, 2012

(65) Prior Publication Data

US 2013/0332003 A1 Dec. 12, 2013

(51) Int. Cl.
*G06F 7/00* (2006.01)
*G06F 17/00* (2006.01)

(52) U.S. Cl.
USPC .................................. 701/1; 701/50; 701/53

(58) Field of Classification Search
CPC .................................................. A01D 41/127
USPC .......................................... 701/1, 50, 53, 33.5
See application file for complete search history.

(56) References Cited

U.S. PATENT DOCUMENTS

| 5,092,819 | A |  | 3/1992 | Schroeder et al. |  |
|---|---|---|---|---|---|
| 5,106,339 | A |  | 4/1992 | Braun et al. |  |
| 5,666,793 | A |  | 9/1997 | Bottinger |  |
| 5,978,720 | A |  | 11/1999 | Hieronymus et al. |  |
| 6,591,145 | B1 | * | 7/2003 | Hoskinson et al. | 700/28 |
| 6,616,527 | B2 |  | 9/2003 | Shinners et al. |  |
| 6,863,604 | B2 | * | 3/2005 | Behnke | 460/6 |
| 7,257,503 | B1 |  | 8/2007 | Anderson et al. |  |
| 7,415,340 | B2 |  | 8/2008 | Fitzner |  |
| 7,540,129 | B2 |  | 6/2009 | Kormann |  |
| 7,610,125 | B2 | * | 10/2009 | Fitzner et al. | 701/24 |
| 7,630,809 | B2 | * | 12/2009 | Behnke et al. | 701/50 |
| 7,677,169 | B2 |  | 3/2010 | Covington et al. |  |
| 7,756,623 | B2 |  | 7/2010 | Jarrett et al. |  |
| 7,872,587 | B2 | * | 1/2011 | Hindryckx et al. | 340/684 |
| 7,873,456 | B2 |  | 1/2011 | Erdmann et al. |  |
| 7,877,969 | B2 | * | 2/2011 | Behnke | 56/10.2 R |
| 8,428,830 | B2 | * | 4/2013 | Diekhans et al. | 701/50 |
| 2003/0066277 | A1 | * | 4/2003 | Behnke | 56/10.2 R |
| 2005/0150202 | A1 | * | 7/2005 | Quick | 56/10.2 R |
| 2007/0005209 | A1 | * | 1/2007 | Fitzner et al. | 701/50 |
| 2009/0088932 | A1 | * | 4/2009 | Diekhans et al. | 701/50 |
| 2009/0229233 | A1 | * | 9/2009 | Pollklas et al. | 56/10.2 R |
| 2010/0065155 | A1 | * | 3/2010 | Peltomae et al. | 144/356 |
| 2010/0121541 | A1 | * | 5/2010 | Behnke et al. | 701/50 |
| 2010/0217481 | A1 | * | 8/2010 | Baumgarten et al. | 701/35 |

FOREIGN PATENT DOCUMENTS

DE 19934882 A1 * 1/2001 ............. A01B 69/00

* cited by examiner

*Primary Examiner* — Khoi Tran
*Assistant Examiner* — Jorge Peche
(74) *Attorney, Agent, or Firm* — Patrick M. Sheldrake; Seyed V. Sharifi T.

(57) ABSTRACT

An evaluation tool related to operation of a combine is provided to aid an operator of the combine. A processing device implements the evaluation tool by receiving an input related to an evaluation to be performed from the operator of the combine. The processing device initializes the evaluation to be performed. A plurality of sensors are operably connected to the processing device and collect data related to the operation of the combine during the evaluation. The processing device analyzes the collected data and presents the analyzed data to the operator of the combine. As such, the operator may review the analyzed data and make an informed choice in proceeding with the combine operation, such as changing settings or operating components to affect the combine performance.

13 Claims, 8 Drawing Sheets

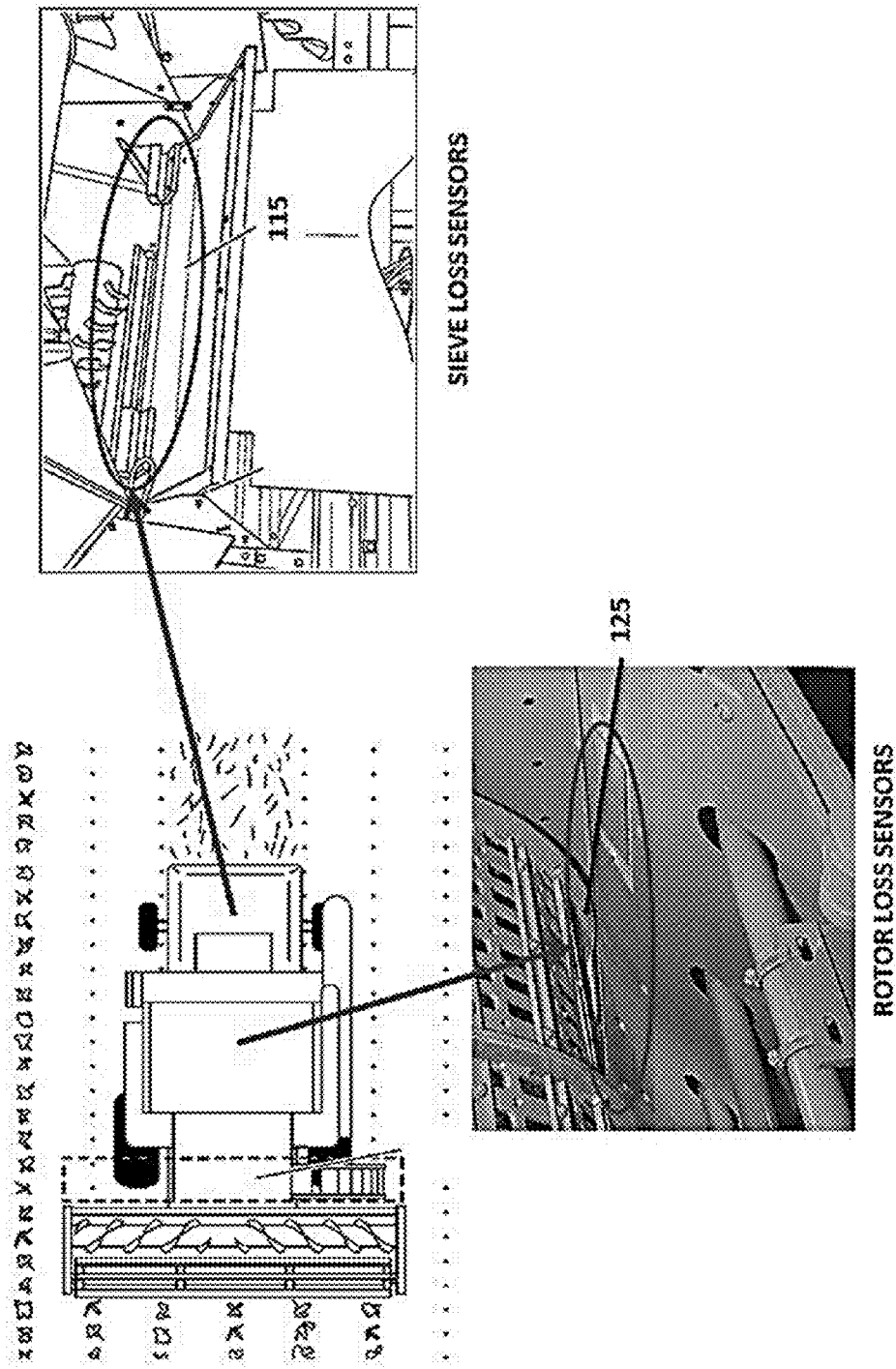

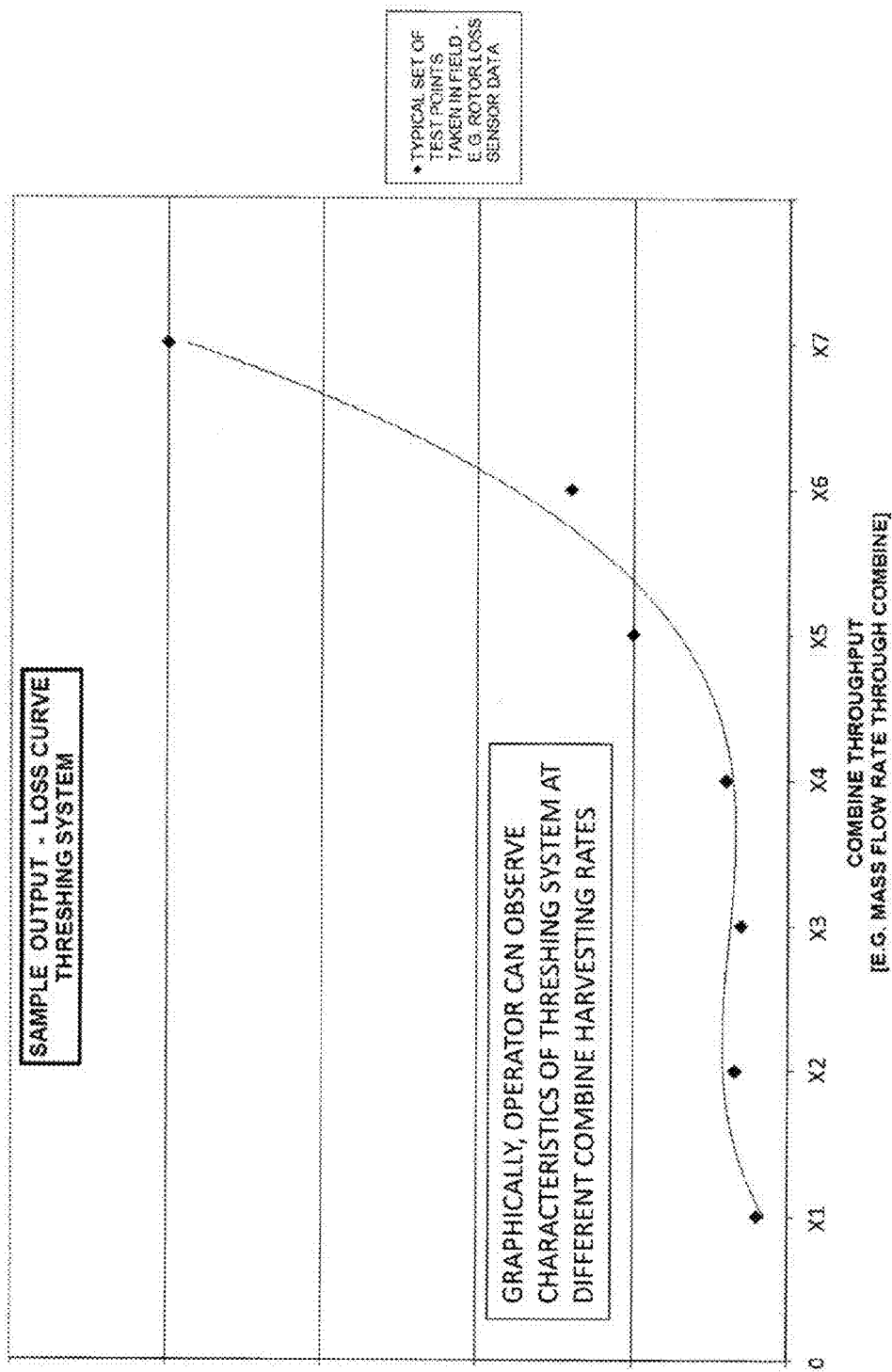

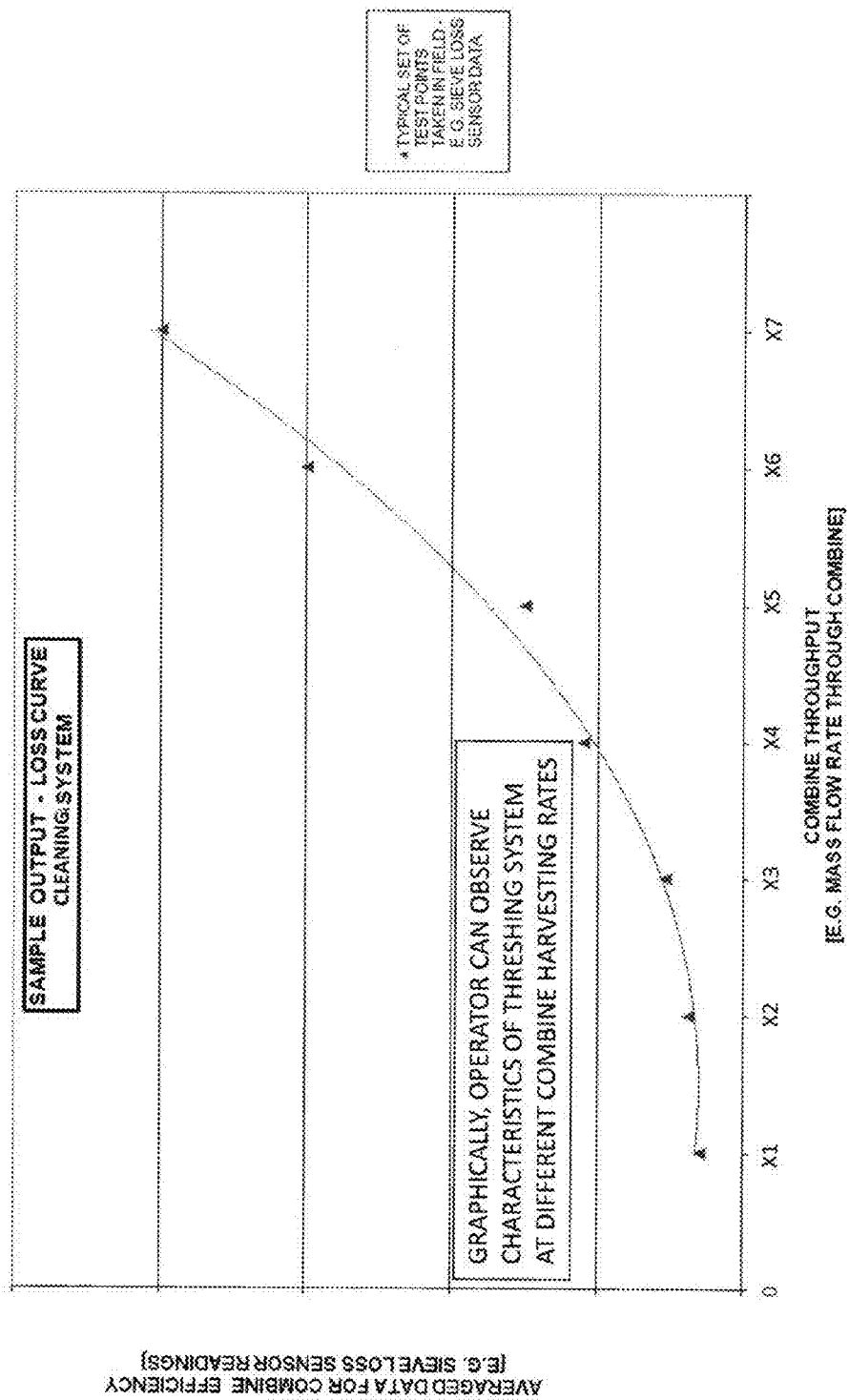

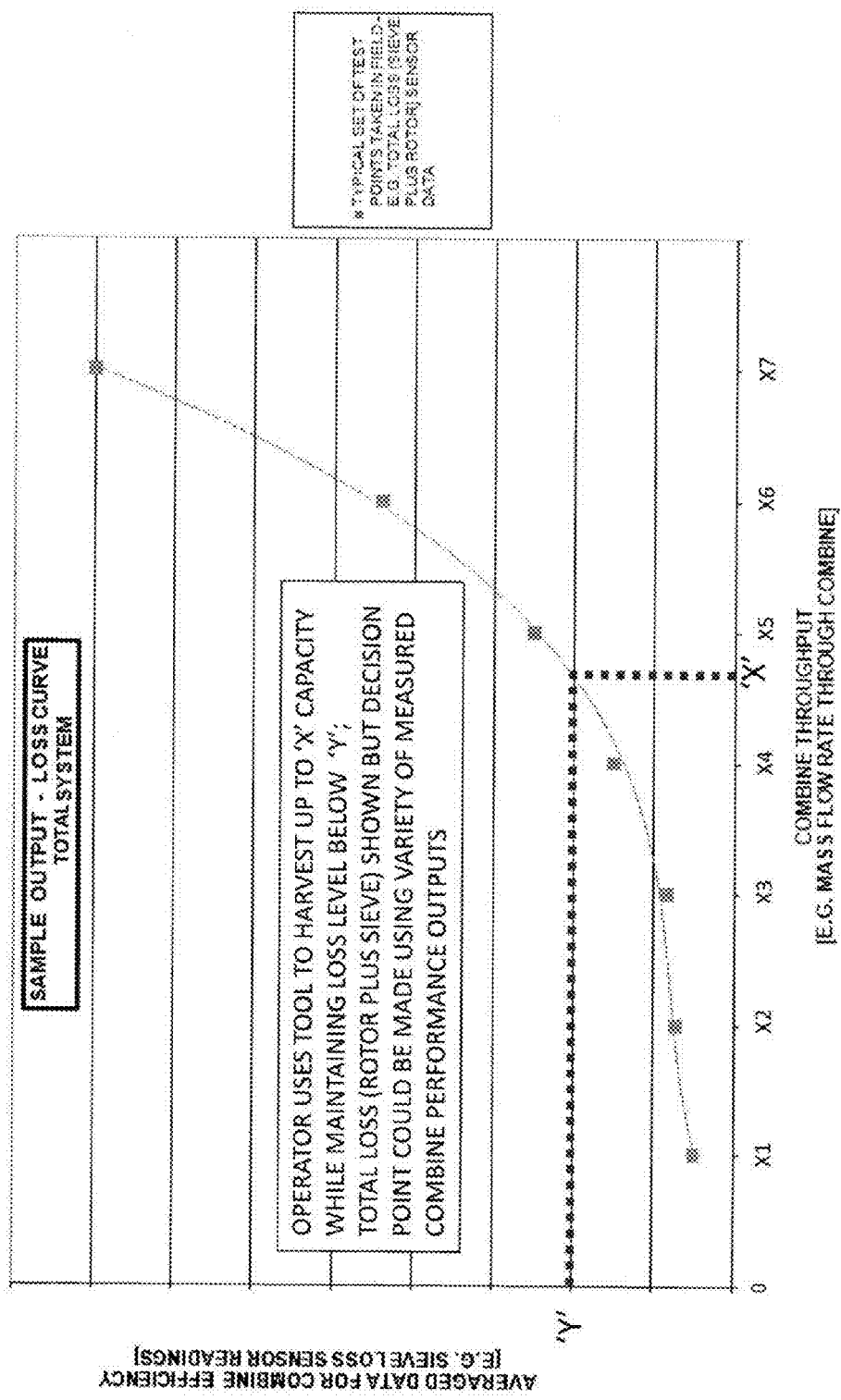

COMBINE PERFORMANCE EVALUATION TOOL

TECHNOLOGY FIELD

The present disclosure relates generally to quantifying effects of operational changes to a combine. More specifically, the present disclosure relates to monitoring and recording changes in a combine's performance over time related to various changes to operational parameters of the combine.

BACKGROUND

A combine harvester, or a combine, is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, flax or linseed, and others. The waste (e.g., straw) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars, commonly referred to as rasp bars or threshing elements, may be bolted. These rasp bars thresh and aid in separating the grains from the chaff and straw through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material are returned to the field via a spreader mechanism.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop be way of a flat oscillating cleaning system that can include a chaffer and sieves. Generally, the cleaning system operates by mechanical and pneumatic methods; blowing air through the threshed crop to winnow the chaff and then sieving the grain to separate the grain from other particulates. Clean grain that is separated from residue via the sieves is typically transported to a grain tank in the combine for temporary storage. The grain tank is typically located atop the combine and loaded via a conveyer that carries clean grain collected in the cleaning system to the grain tank.

In normal operation, an operator of a combine tries to optimize the performance of the combine by making various adjustments to operational parameters of the combine and then trying to quantify the positive/negative effect the change had. Various functional components or parameters of a combine can be adjusted by the operator, and there impacts on the operating efficiency of the combine can be monitored. For example, the forward speed of the combine can be controlled by the operator. However, as speed increases, so too does the amount of material collected. However, once the operator reaches a certain forward speed, an amount of material lost begins to increase dramatically. The threshing process can only handle so much material regardless of the forward speed of the combine, and at a certain speed collected grain begins to be lost as the thresher cannot keep up with the amount of material collected. A loss sensor measures the amount of lost material and an indicator in the cab of the combine may display this measured amount to the operator via a gauge reading or a graph on a digital display. Additionally, an audible alarm may sound indicating the high loss levels to the operator. The operator may then adjust the speed such that the amount of grain collected is balanced against the amount of grain being lost, thus running the combine at the most efficient forward speed. Additional functional components such as the sieves, blowers, grates, and other components can be adjusted as well, impacting the overall efficiency of the combine.

The visual indicators in the cab have several inherent drawbacks. For example, the indicators are only showing information in real-time and may be constantly fluctuating as the density or type of crop being harvested changes. In order to provide a historical reading over time, the operator must watch the monitors and mentally assign a value to the average readout level. This process must be done almost concurrently for many different parameters. The process is therefore prone to errors and the accuracy is subjective and limited in scope.

Another means for collecting historical readings is to physically inspect samples of harvested material in the field to determine any associated loss. This process is time consuming and requires special procedures to get good data representative of the combine performance.

SUMMARY

Embodiments of the present invention provide a method of determining data related to an operation of a combine. The method includes receiving, at a processing device, an input from an operator of the combine, where the input comprises information related to an evaluation to perform. The processing device initializes the evaluation to perform. At a plurality of sensors operably connected to the processing device, data related to the operation of the combine during the evaluation is collected. The processing device analyzes the data and presents the analyzed data to the operator of the combine.

In some embodiments, the method of determining data related to the operation of the combine further includes comparing, by the processing device, the analyzed data against previously obtained data from a prior evaluation.

In some embodiments, the comparing operation includes displaying, on a display device operably connected to the processing device, a first loss-curve representing the analyzed data and a second loss-curve representing the previously obtained data.

In some embodiments, the input from the operator of the combine includes at least one of duration of the evaluation to perform and operational parameters of the combine to monitor during the evaluation to perform.

In some embodiments, presenting the analyzed data to the operator of the combine comprises displaying, on a display device operably connected to the processing device, the analyzed data.

In some embodiments, presenting the analyzed data to the operator of the combine comprises storing, on a non-transitory computer readable medium connected to the processing device, the analyzed data as an electronic file.

In some embodiments of the present invention, the method of determining data related to the operation of the combine further includes receiving, at the processing device, a second input from an operator of the combine, where the input comprises information related to a second evaluation to perform. The processing device initializes the second evaluation to perform, and a plurality of sensors connected to the processing device collect second data related to the operation of the combine during the second evaluation. The processing device analyzes the second data and presents the analyzed second data to the combine operator.

In some embodiments, the processing device compares the analyzed data against the analyzed second data.

Embodiments of the present invention provide a system that determines data related to an operation of a combine. The system includes a processing device and a non-transitory computer readable storage medium operably connected to the processing device configured to store a set of instructions. The set of instructions instruct the processor to receive an input from an operator of the combine, where the input includes information related to an evaluation to perform. The set of instructions further instruct the process to initialize the evaluation to perform; collect, from a plurality of sensors operably connected to the processing device, data related to the operation of the combine during the evaluation; analyze the data; and present the analyzed data to the operator of the combine.

In some embodiments, the instructions further instruct the processor to compare the analyzed data against previously obtained data from a prior evaluation.

In some embodiments, the instructions for comparing the analyzed data further instruct the processor to display, on a display device operably connected to the processing device, a first loss-curve representing the analyzed data and a second loss-curve representing the previously obtained data.

In some embodiments, the input from the operator of the combine includes at least one of duration of the evaluation to perform and operational parameters of the combine to monitor during the evaluation to perform.

In some embodiments, the instructions for presenting the analyzed data to the operator of the combine further instruct the processor to display, on a display device operably connected to the processing device, the analyzed data.

In some embodiments, the instructions for presenting the analyzed data to the operator of the combine further instruct the processor to store, on the non-transitory computer readable medium, the analyzed data as an electronic file.

In some embodiments, the instructions further instruct the processor to receive a second input from an operator of the combine, where the input includes information related to a second evaluation to perform; initialize the second evaluation to perform; collect, from a plurality of sensors operably connected to the processing device, second data related to the operation of the combine during the second evaluation; analyze the second data; and present the analyzed second data to the operator of the combine.

In some embodiments, the instructions further instruct the processor to compare the analyzed data against the analyzed second data.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 1b illustrates various sensor locations on the harvester according to an embodiment;

FIGS. 4A-4C illustrates various graphs showing loss curves generated as a result of an evaluation procedure such as that shown in FIG. 3.

DETAILED DESCRIPTION

Figure 1A:
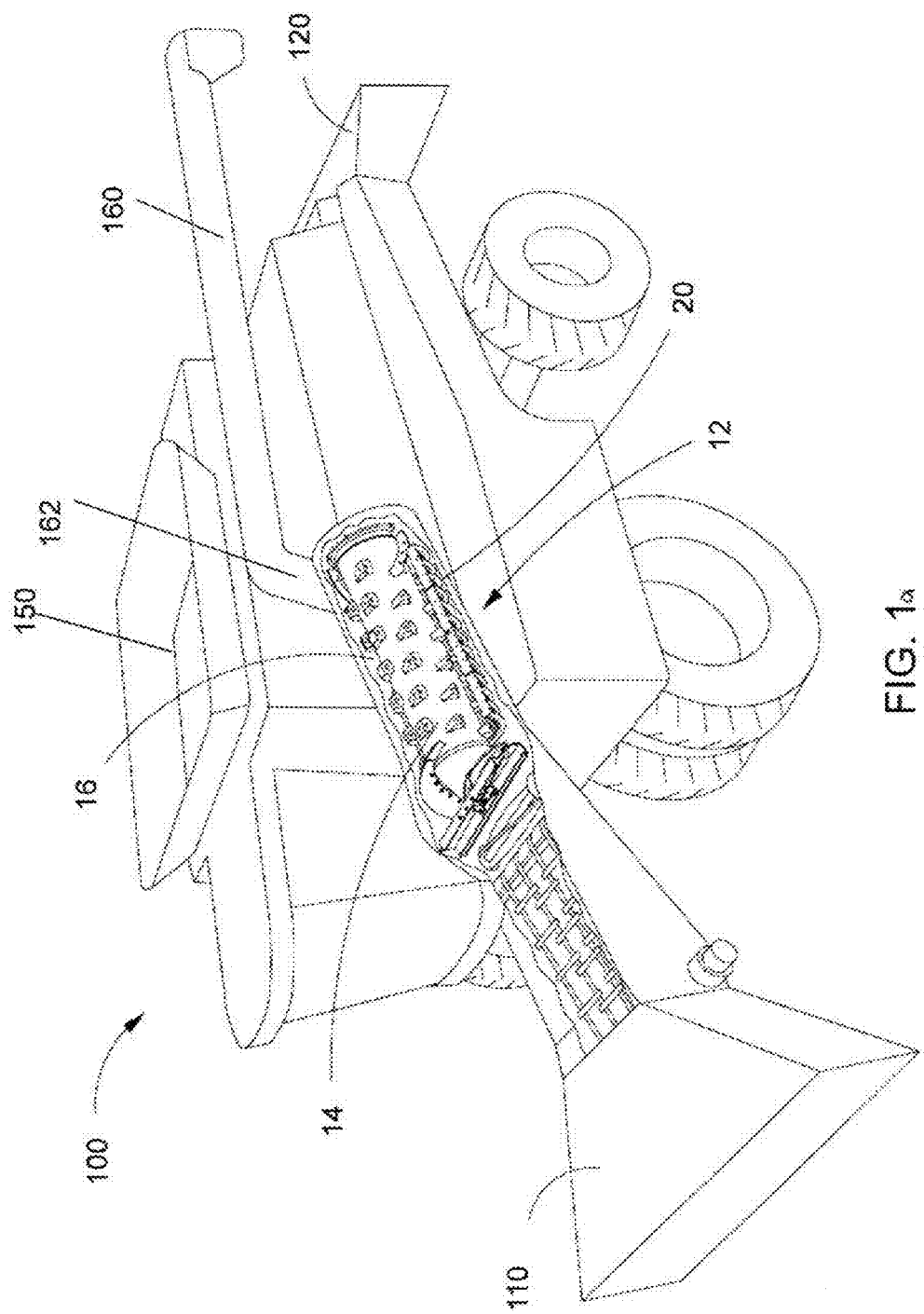
FIG. 1a is a perspective view of a harvester.

FIG. 1a shows an exemplary agricultural combine 100, which may also be referred as a combine or harvester throughout this specification. As shown in FIG. 1a, the combine 100 can include a header 110, a longitudinally axially arranged threshing and separation system 12, and a concave 20 within the threshing and separation system 12. The threshing mechanism may also be of any well-known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concaves 20 may extend circumferentially around the rotor 14 and the flow of crop may pass in the space between the spinning rotor and the concaves. As the crop material flows through the threshing and separation system 12, the crop material including, for example, grain, straw, legumes, and the like, will be loosened and separated from crop residue or MOG (material other than grain) such as, for example, husks, cobs, pods, and the like, and the separated materials may be carried away from the threshing and separation system 12 in a well-known conventional manner. Crop residue can be redistributed to the field via a spreader 120, located at the back of the harvester.

The remaining threshed crop, which includes the grain to be collected, is then cleaned via a cleaning system (not shown). The cleaning system can include conventional winnowing mechanisms including a fan that blows air across a series of reciprocating sieves. Through the winnowing action of the air and the reciprocating sieves, clean grain may be collected and sorted from the remaining chaff. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, a one or more cross augers move grain laterally from the bottom of the grain tank 150 to vertical tube 162 of unload tube 160 representing a turret style system of offloading. Vertical tube 162 may include an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown. In a swivel style offloading system (not shown), the vertical tube 162 and unload tube 160 is replaced by an unloading auger that is attached to the one or more cross augers conveying grain from the cleaning system and may pivot from side to side from the combine 100, conveying grain from the combine 100.

Each of the various components of the combine 100 may have an associated controller and sensor for changing operating parameters of the component from the cab while the combine is in operation. For example, as shown in FIG. 1b, one or more sieve loss sensors 115 may be integrated near the rear of the combine 100. Similarly, one or more rotor loss sensors 125 may be integrated about the rotor assembly. Thus, the operator of the combine 100 may change the parameters of the combine and see, on a display in the cab, if that change has impact to the operational losses of the combine. However, as discussed above, this information has typically been shown in real-time, requiring the operator to interpret the data as they are operating the combine and, thus, potentially distracted.

Figure 2:
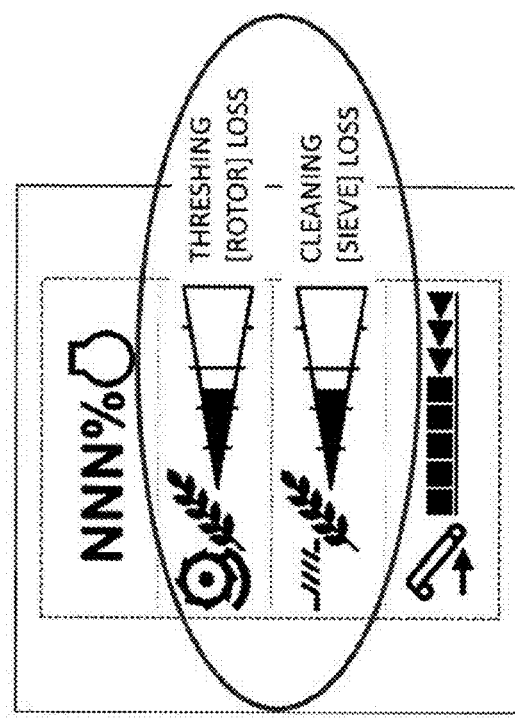
FIG. 2 illustrates various examples of screenshots on a display mounted within the harvester according to an embodiment.

FIG. 2 illustrates exemplary screenshots related to the real-time operation of the combine 100. For example, screenshot 201 illustrates an exemplary set of runtime parameters related to combine throughput. The operator of the combine 100 may be able to access various information such as time worked, average moisture, various flow rates, and other information related to the operation of the combine. A second screenshot 202 may show the current performance levels of the combine 100. For example, losses due to threshing and cleaning may be displayed. This information may be used to determine overall combine efficiency. However, as noted above, this information is often displayed in real-time, and the operator of the combine 100 may not have time to appreciate or interpret the information during operation of the combine.

The present disclosure relates to a system and method for collecting and displaying information related to various performance characteristics of a combine as collected during a testing or evaluation period performed over a period of time, e.g., 1 minute. Most of the combine performance characteristics are monitored electronically. While most of this monitoring is presented to the operator in the form of real-time streaming read-outs, the electronic signals may be collected as data in the combine controllers and can be logged or recorded and output in an electronic format to the operator or another person related to the operation of the combine such as a manager. This provides for subsequent review and analysis, which can be performed to assign an average value to each parameter for the period recorded. By use of software or other interactive modules installed in the operating computer or controller of the combine, a system may be created where a customer requests that performance data be collected and averaged for a defined or chosen period of time, and the associated values output either as displayed data or through downloadable (or otherwise accessible) data files. This may provide the customer with the ability to compare the values for a given configuration of the combine to values collected after making a relatively immediate adjustment, holding all other operating conditions relatively constant. The customer may then make an informed decision if the change to the operating condition was positive or negative to the overall efficiency of the combine, making the process quick and less subjective that the previous approaches as discussed above.

For example, an operator may be running a combine through a field at a constant groundspeed. Upon activation of the system (e.g., through a button push or another similar input from the operator), a span of data is collected and analyzed to giver average readings for the combine at that groundspeed. An output such as an electronic file and/or a monitor readout is the cab is generated so that the operator can see the assigned values for any requested data such as rotor loss, cleaning loss, percentage of engine horsepower being used, tailings level, and other similar data. The customer may then adjust one or more operating parameters on the combine such as rotor speed, sieve spacing, fan speed, groundspeed, or other similar operating parameters, and perform the evaluation again for the same period of time. The second evaluation may yield a similar set of results as the first evaluation. By comparing the values from the first evaluation to the second evaluation, the customer can make an immediate decision about the value of the combine adjustment without subjectively trying to interpret multiple readouts at once and/or climbing out of the combine to look for and analyze grain loss behind the combine. An evaluation and analysis procedure is discussed in greater detail in the following discussion of FIG. 3.

Figure 3:
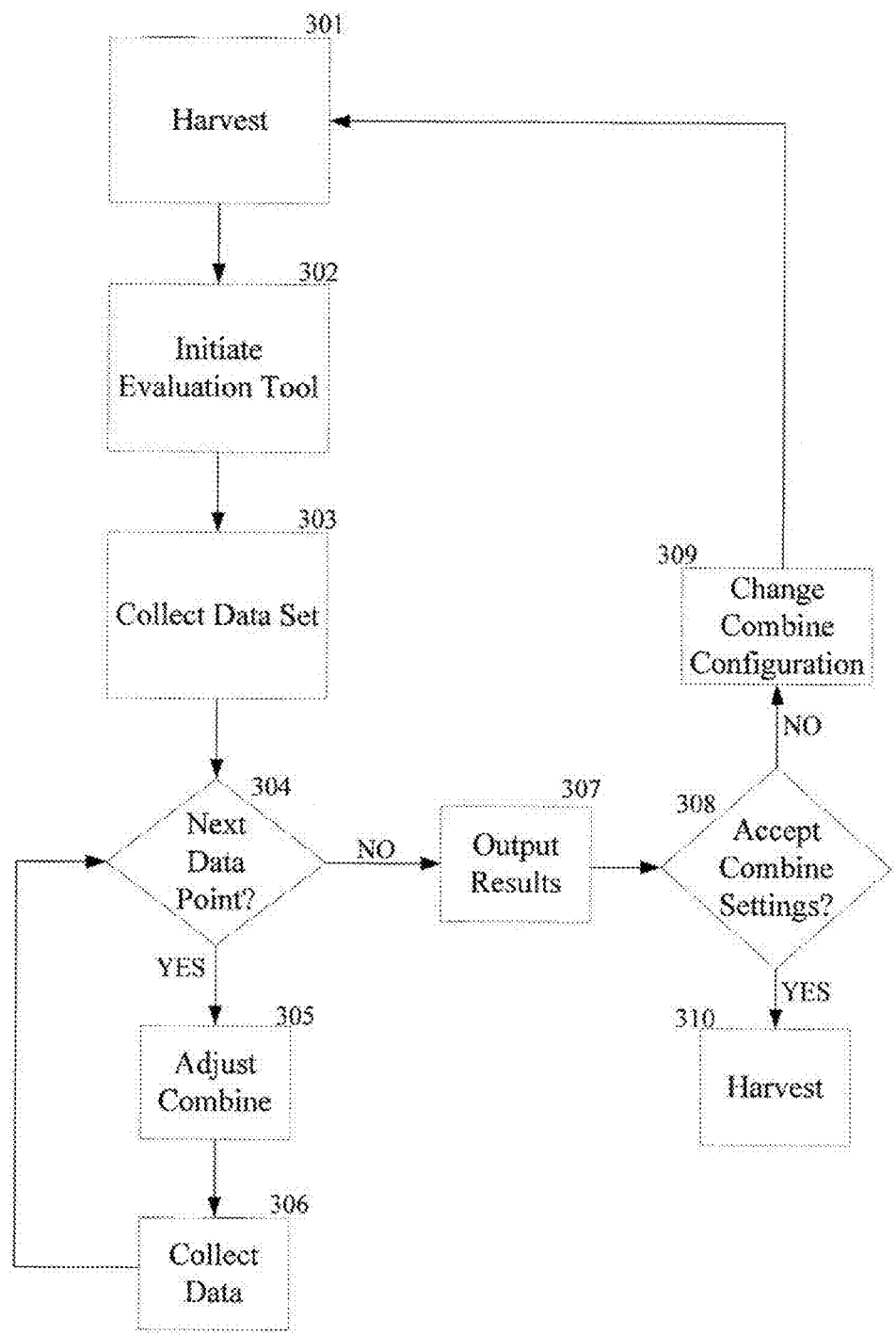
FIG. 3 illustrates a flowchart illustrating an example of an evaluation procedure according to an embodiment of the invention.

FIG. 3 illustrates an exemplary flowchart showing as evaluation procedure according to an embodiment of the present disclosure. Initially, various operating parameters for the combine may be set by an operator of the combine, or preloaded according to existing operational data related to the combine. For example, a manufacturer may include a collection of parameters a customer may use to calibrate the combine at the start of each harvesting season or upon changing the crop material being harvested.

Once the test parameters are set, the operator may begin harvesting 301. During harvesting, the sensors on the combine may measure various performance information such as mass flow rate of cut material. While harvesting, the operator may initiate 302 the evaluation tool. Alternatively, the evaluation tool may automatically initiate 302 during harvesting. The evaluation tool may collect 303 a first data set during the harvesting 301.

Once a data set has been collected 303, the evaluation tool may prompt 304 the operator of the combine for another data point. If the operator selects another data point, one or more operating parameters of the combine may be adjusted 305. For example, the combine throughput may be adjusted 305, resulting in a new mass flow rate. The operator may continue to harvest 301 while a new data set is collected 306. After the new data set is collected 306, the evaluation tool may again prompt 304 the operator for a new data point.

If the operator selects not to enter a new data point, the evaluation tool may output 307 a set of results. Outputting 307 the results may include displaying information on the display in the cab, saving the information as an electronic file for access by the operator via an external computing device such as a notebook computer, or other similar means of presenting the information. The information may include the data the operator requested be collected and how any changes to the operational parameters of the combine has affected the performance of the combine. The information may be displayed as one or more graphs showing a loss-curve.

FIGS. 4A-4C illustrate several examples of loss-curve graphs. For example, FIG. 4A illustrates the loss at the threshing system for multiple data points X1-X7. FIG. 4B illustrates the loss at the cleaning system for the same data points X1-X7. FIG. 4C illustrates a combined total system loss curve for the combine, including an acceptable threshold level (labeled X, Y) for the combine. By examining the loss-curve graphs, the operator of the combine may determine during which data point was the combine performing at an optimum level.

After the operator reviews the output 307 data, the evaluation tool may prompt 308 the operator to accept the combine settings or to adjust the combine settings. If the operator chooses to change 309 the combine settings, the evaluation process may be repeated for the new settings. If the operator opts to keep the settings, the operator may harvest 310 at the parameters defined by the optimum data point as shown in the loss-curve graphs.

In an exemplary embodiment, an operator may be harvesting in a field. The operator may depress a button to initiate the evaluation tool. The evaluation software program may prompt the operator to maintain approximately constant operating characteristics (e.g., maintain ground speed or maintain grain flow rates or maintain a system power at approximately constant levels). An example of grain flow rates may be bushels per hour of grain (wet or dry) entering the grain tank. An example of a system power may be power used by the combine feeder or percent of available engine horsepower being used. The data collection may begin for a pre-determined duration (e.g., 1 minute). An internal processor may average any collected data and store an average value for each measured parameter. The program may then prompt the operator for a new operational setting (e.g., a new flow rate). The operator may change to the new operational setting and data collection may begin at that new operational setting and continue for the measured parameter. Again, average values for each measured parameter are stored. This process may repeat until the operator signals an end to the evaluation. Internal post-processing may output data to the display using a graphical interface for the operator to review. Based upon the information, the operator may choose to change the combine configuration (e.g., changes settings, operating components) to affect performance and repeat the evaluation process. The operator may compare various result sets and set-up the combine according to the best case set of results, thereby maximizing the efficiency of the combine.

Figure 5:
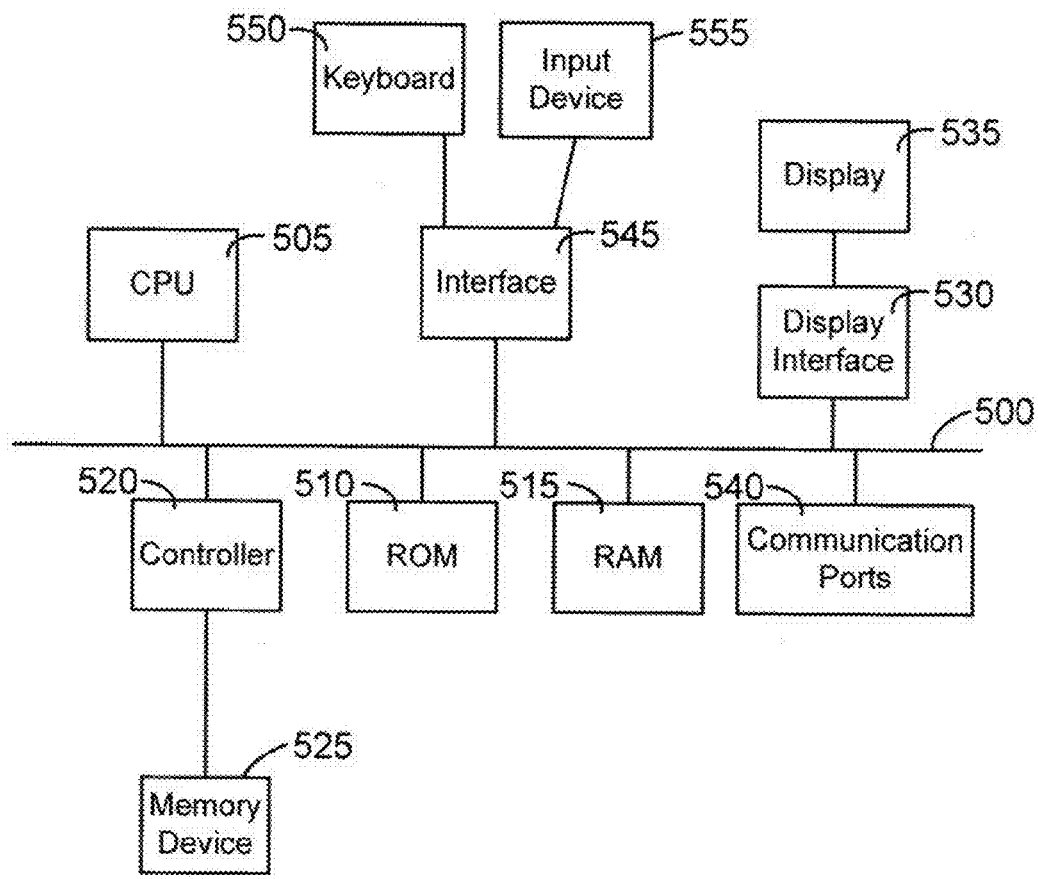
FIG. 5 illustrates a computing device for performing various functions related to the evaluation procedure according to an embodiment.

FIG. 5 depicts a block diagram of exemplary internal hardware that may be implemented in a combine to contain or implement the various computer processes and systems as discussed above. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. Read only memory (ROM) 510 and random access memory (RAM) 515 constitute exemplary memory devices.

A controller 520 interfaces with one or more optional non-transitory memory devices 525 to the system bus 500. These memory devices 525 may include, for example, an external or internal DVD drive, a CD ROM drive, a hard drive, flash memory, a USB drive or the like. As indicated previously, these various drives and controllers are optional devices. Additionally, the memory devices 525 may be configured to include individual files for storing any software modules or instructions, auxiliary data, common files for storing groups of test results, or one or more databases for storing the result information, auxiliary data, and related information as discussed above.

Program instructions, software or interactive modules for performing any of the functional steps associated with the testing and analyzing processes as described above may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 530 may permit information from the bus 500 to be displayed on the display 535 in audio, visual, graphic or alphanumeric format. For example, a display 535 may be positioned in the cab of the combine such that the operator of the combine can safely see the information during operation of the combine. The information may include results information related to one or more previously performed test cases. Communication with external devices may occur using various communication ports 540. An exemplary communication port 540 may be attached to a communications network, such as the Internet or a local area network, or directly to a portable computing device such as a notebook computer.

The hardware may also include an interface 545 which allows for receipt of data from input devices such as a keyboard 550 or other input device 555 such as a mouse, a joystick, a touch screen, a remote control, a pointing device, a video input device and/or an audio input device positioned within the cab of the combine and accessible by the operator prior to the testing procedure.

It should be noted that the systems and processes discussed herein are shown by way of example only, and are intended to increase the ability of a combine customer or operator to make informed decisions related to the operation of the combine by providing more quantitative and timely results regarding combine performance. The systems and processes described herein also provide a customer or operator with the ability to rank effects of changes in combine operational parameters, thereby increasing the likelihood of operators effectively fine-tuning combine configurations, resulting in optimized settings, better overall field performance, and improved brand recognition.

Although the invention has been described with reference to exemplary embodiments, it is not limited thereto. For example, two pairs of opposing compression rollers can be employed to ensure completely crushed crop materials. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed is:

1. A method of determining data related to an operation of a combine, the method comprising:
   receiving, at a processing device, an input from an operator of the combine, the input comprising information related to an evaluation to perform;
   initializing, by the processing device, the evaluation to perform;
   collecting, at a plurality of sensors operably connected to the processing device, data related to the operation of the combine during the evaluation;
   analyzing, by the processing device, the data; and
   presenting, by the processing device, the analyzed data to the operator of the combine; and comparing, by the processing device, the analyzed data against previously obtained data from a prior evaluation by displaying, on a display device operably connected to the processing device, a first loss-curve representing the analyzed data and a second loss-curve representing the previously obtained data.

2. The method of claim 1, wherein the input comprises at least one of duration of the evaluation to perform and operational parameters of the combine to monitor during the evaluation to perform.

3. The method of claim 1, wherein presenting the analyzed data to the operator of the combine comprises displaying, on a display device operably connected to the processing device, the analyzed data.

4. The method of claim 1, wherein presenting the analyzed data to the operator of the combine comprises storing, on a non-transitory computer readable medium connected to the processing device, the analyzed data as an electronic file.

5. The method of claim 1, further comprising:
receiving, at the processing device, a second input from an operator of the combine, the input comprising information related to a second evaluation to perform;
initializing, by the processing device, the second evaluation to perform;
collecting, at a plurality of sensors operably connected to the processing device, second data related to the operation of the combine during the second evaluation;
analyzing, by the processing device, the second data; and
presenting, by the processing device, the analyzed second data to the operator of the combine.

6. The method of claim 5, further comprising comparing, by the processing device, the analyzed data against the analyzed second data.

7. A system for determining data related to an operation of a combine, the system comprising:
a processing device; and
a non-transitory computer readable storage medium operably connected to the processing device and configured to store a set of instructions that instruct the processor to:
receive an input from an operator of the combine, the input comprising information related to an evaluation to perform;
initialize the evaluation to perform;
collect, from a plurality of sensors operably connected to the processing device, data related to the operation of the combine during the evaluation;
analyze the data; and
present the analyzed data to the operator of the combine
wherein the instructions further instruct the processor to compare the analyzed data against previously obtained data from a prior evaluation and the instructions for comparing the analyzed data further instruct the processor to display, on a display device operably connected to the processing device, a first loss-curve representing the analyzed data and a second loss-curve representing the previously obtained data.

8. The system of claim 7, wherein the input comprises at least one of duration of the evaluation to perform and operational parameters of the combine to monitor during the evaluation to perform.

9. The system of claim 7, wherein the instructions for presenting the analyzed data to the operator of the combine further instruct the processor to display, on a display device operably connected to the processing device, the analyzed data.

10. The system of claim 7, wherein the instructions for presenting the analyzed data to the operator of the combine further instruct the processor to store, on the non-transitory computer readable medium, the analyzed data as an electronic file.

11. A system for determining data related to an operation of an agricultural harvester, the system comprising:
a processing device; and
a non-transitory computer readable storage medium operably connected to the processing device and configured to store a set of instructions that instruct the processor to:
receive an input from an operator of the combine, the input comprising information related to an evaluation to perform;
initialize the evaluation to perform;
collect, from a plurality of sensors operably connected to the processing device, data related to the operation of the harvester during the evaluation;
analyze the data;
present the analyzed data to the operator of the harvester; and
wherein the instructions further instruct the processor to compare the analyzed data against previously obtained data from a prior evaluation using from a different input,
wherein the analyzed data and previously obtained data are both, collected during for similar lengths of time wherein all other operating conditions of the harvester are held relatively constant and wherein the controller is configured to calculate separate representative value for the analyzed data and the previously obtained data for comparison; and
wherein the instructions further instruct the processor to compare the analyzed data against previously obtained data from a prior evaluation and the instructions for comparing the analyzed data further instruct the processor to display, on a display device operably connected to the processing device, a first loss-curve representing the analyzed data and a second loss-curve representing the previously obtained data.

12. The system of claim 11, wherein the instructions further instruct the processor to:
receive a second input from an operator of the harvester, the input comprising information related to a second evaluation to perform;
initialize the second evaluation to perform;
collect, from a plurality of sensors operably connected to the processing device, second data related to the operation of the harvester during the second evaluation;
analyze the second data; and
present the analyzed second data to the operator of the harvester.

13. The system of claim 12, wherein the instructions further instruct the processor to compare the analyzed data against the analyzed second data.

* * * * *